United States Patent
Gozdeck et al.

(10) Patent No.: US 6,636,852 B2
(45) Date of Patent: Oct. 21, 2003

(54) INCOME PLANNER FOR CORPORATE SALES AGENTS

(75) Inventors: Karen Walluk Gozdeck, San Francisco, CA (US); Sudhakar Vissapragada, Foster City, CA (US); Xinyang Fan, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 234 days.

(21) Appl. No.: 09/758,979

(22) Filed: Jan. 11, 2001

(65) Prior Publication Data

US 2001/0049622 A1 Dec. 6, 2001

Related U.S. Application Data

(60) Provisional application No. 60/185,872, filed on Feb. 29, 2000.

(51) Int. Cl.$^7$ .................. G06F 17/30; G06F 17/60
(52) U.S. Cl. ................................. 707/9; 705/11
(58) Field of Search .................. 707/1–4, 9, 100, 707/102, 204, 526, 513; 705/9, 11

(56) References Cited

U.S. PATENT DOCUMENTS 5,987,434 A * 11/1999 Libman ................. 705/36

2001/0047282 A1 * 11/2001 Raveis ................. 705/7

* cited by examiner

Primary Examiner—Alford Kindred
(74) Attorney, Agent, or Firm—Young Law Firm, P.C.

(57) ABSTRACT

A computer-implemented method for computing the compensation for sales agents within a corporate sales force of a deploying company includes steps of creating one or more sales agent compensation plans tailored to provide an incentive for the sales agents to sell goods and/or services according to a corporate sales strategy. The compensation plan(s) are then stored within a database. Sales agents are then provided with remote access to the database via a computer network, such as the Internet. The sales agents may then input past sales into the database and may input, qualify, modify and/or store future sales opportunities into the database. The past sales and future sales opportunities may then be applied to one or more of the stored compensation plan(s) to calculate the sales agents' compensation. Quota achievement levels may be included in the calculated compensation and graphically or textually displayed for the sales agents. The sales agents may enter hypothetical sales opportunities and determine, in real time, how those hypothetical sales opportunities would affect their compensation, should the sales underlying the hypothetical opportunities close. The compensation plans may be updated and/or replaced as needed to enable the sales force to easily respond to changing market conditions and/or as new products, services and/or promotions are offered by the deploying company.

32 Claims, 4 Drawing Sheets

| File | Edit | View | Go | Help |

LOCATION: http://dsajdasd.com/haskjd/324es/342we/RF?=342334

Sales Rep.: Smith, Jane E.     Reporting Period: JUNE 2000
Compensation Plan: FY2000 Sales Rep. Lvl 1     Currency: USD

— 310

- Compensation Summary
- Compensation Detail
- Blind Ranking
- Income Planner

— 320

Percentage of Quota Achievement
☒ Computer Sales
☐ OS Sales

% of Quota: 100, 80, 60, 40, 20, 0
PTD   QTD   YTD

— 330

ALL SALES

| | PTD | YTD |
|---|---|---|
| Commission Earned: | 3,550.00 | 65,544.00 |
| Revenue: | 44,375.00 | 1,555,435.00 |
| Quota Achievement %: | 80.2 | 51.1 |

INCOME PLANNER FOR CORPORATE SALES AGENTS

This application claims the benefit of provisional application No. 60/185,872 filed Feb. 29, 2000.

BACKGROUND OF THE INVENTION

1. Field of the Invention

The present invention relates to computer implemented methods and systems for the determination of the sales-based compensation (e.g., commission) earned by sales agents within a corporate sales force.

2. Description of the Related Art

Corporations and other large entities often employ a large number of sales agents to sell their products and/or services. The compensation of these sales agents is often performance-based; that is, at least a portion of the sales agents' compensation may be derived from the value and/or volume of the goods and/or services sold by the sales agent during a preceding time period. The sales agents' compensation is often set out as a contractual agreement (the "compensation plan") between the corporation and the sales agent. Such agreements typically are crafted to implement the corporate sales strategy, and are often subject to change as the competitive landscape evolves and/or as new products and services are offered for sale by the corporation. To maximize his or her compensation, therefore, it is essential that the sales agent fully understand the terms of the compensation plan. However, as such compensation plans are complex (often including promotions, discounts, quotas, incentives, etc.) the sales agent typically must expend a considerable amount of time to estimate his or her compensation. Traditionally, sales agents have been relegated to such inadequate means as scratchpads and custom spreadsheets to determine their compensation, based on previously closed deals and future sales opportunities that may or may not close within the time frame of interest. Sales agents, therefore, typically spend an inordinate amount of time estimating their compensation, time that should rather be expended in the field, selling the goods and/or services with which the sales agent is tasked with selling.

In addition, each time that the corporation changes the compensation plan in response to the introduction of a new product and/or service, or in response to changes in the competitive landscape, a new compensation plan must be drafted and disseminated to each sales agent within the corporate sales force. Each sales agent then must review the plan, sign it and implement the plan. In turn, each sales agent, to maximize their compensation, must modify their spreadsheets or other means of calculating their compensation to gain a realistic estimate of their future compensation under the new plan. Again, this process reduces the sales agents' efficiency and corporate revenues, as well as the corporation's ability to fluidly influence the behavior of the sales force in the face of changing conditions.

What are needed, therefore, are methods and systems to allow corporations and other large entities to provide their sales agents with real time estimates of their sales-based compensation. What are also needed are methods and systems to allow sales agents to remotely compute their compensation in real time, based upon the latest version of their compensation plan. Also needed are methods and systems that enable corporations to field a more nimble sales force; that is, one that responds quickly to changes in corporate sales strategies, and one that sells the right product to the right customer at the right time.

SUMMARY OF THE INVENTION

A computer-implemented method of computing a compensation for a sales agent within a corporate sales force, according to an embodiment of the present invention, includes the steps of creating a sales agent compensation plan, the compensation plan being tailored to provide an incentive for the sales agent to sell goods and/or services according to a corporate sales strategy; storing the compensation plan within a database; providing remote access to the database via a computer network; enabling the sales agent to remotely access the database and to input past sales into the database and to input, qualify, modify and store future sales opportunities into the database; applying the past sales and future sales opportunities to the stored compensation plan to calculate a compensation for the sales agent and reporting the calculated compensation to the sales agent over the network.

According to further embodiments, the computer network may include the Internet. The enabling step may include a step of allowing the sales agent to securely log onto an application adapted to carry out the functionality of at least the applying and providing steps. The enabling step may provide access to the database using an HTML and/or dHTML-enabled browser, for example. The calculated compensation may be determined for a specified time period. The creating step may include a step of including one or more sales quotas for the sales agent in the compensation plan, and the reported compensation may include an indication of an achievement level of the sales quota(s) by the sales agent. A quota for each of the goods and/or services for which the sales agent is tasked with selling may be established and the level of achievement thereof may be reported in the compensation report. The achievement level of the sales quota(s) may be represented as a graph, text and/or table. The calculated compensation reported to the sales agent may be broken down into a plurality of compensation categories. The reported compensation in each of the compensation categories may be hyperlinked to a corresponding inputted sales opportunity. A step of inputting hypothetical sales opportunities may be carried out, wherein the reported calculated compensation reflects the sales agent's past sales and the inputted hypothetical sales opportunities to enable the sales agent to forecast a compensation to be received if the inputted hypothetical sales opportunities close. The sales agent may qualify the sales opportunity by assigning a status to the sales opportunity. A step may be carried out to specify the status of the sales opportunities to be applied to the stored compensation plan to calculate and report the compensation for the sales agent. A step of modifying the created compensation plan to conform to an updated corporate sales strategy may also be carried out. A step of substituting the created compensation plan with a new compensation plan may also be carried out, the applying step then applying the past sales and future sales opportunities to the new compensation plan to calculate the compensation for the sales agent. The creating step may create a plurality of compensation plans and the applying step may apply the past sales and future sales opportunities to one or more of the plurality of compensation plans.

A computer-implemented method for providing an indication of a compensation for a sales agent within a corporate sales force, according to still another embodiment of the present invention, may include steps of retrieving past sales and future sales opportunities of an authenticated sales agent from a database; retrieving at least one compensation plan for the authenticated sales agent; applying the retrieved past sales and future sales opportunities to the retrieved compensation(s) plan to calculate a compensation of the sales agent and providing an indication of the calculated compensation to the authenticated sales agent remotely over a computer network.

The present invention may also be thought of as an electronic system for remotely providing sales agents within a sales force with an indication of their sales-based compensation over a computer network. According to this embodiment, the system may include a database configured to store one or more compensation plans, the sales agents' past sales and future sales opportunities. One or more first computers may be arranged to receive login and authentication requests from the sales agents over the computer network, to retrieve an appropriate compensation plan or plans for each of the logged in and authenticated sales agents from the database and to retrieve each of the sales agents' past sales and future sales opportunities from the database. The first computer(s) may also be configured to apply the retrieved past sales and future sales opportunities to the appropriate compensation plan(s) upon request to generate a compensation report for each of the sales agents and to send the generated compensation reports to the one or more second computers. The second computer(s) may be arranged to accept login and authentication requests from the sales agents and to send the requests to the first computer(s) over the computer network. The second computer(s) may also be arranged to input new future sales opportunities into the database, to modify future sale opportunities previously stored in the database, to request the compensation report from the at least one first computer and to display the compensation report received from the at least one first computer.

BRIEF DESCRIPTION OF THE DRAWINGS

FIG. 3 is a diagram of a compensation report, according to an embodiment of the present invention.

DESCRIPTION OF THE INVENTION

Functional Description

Figure 1:
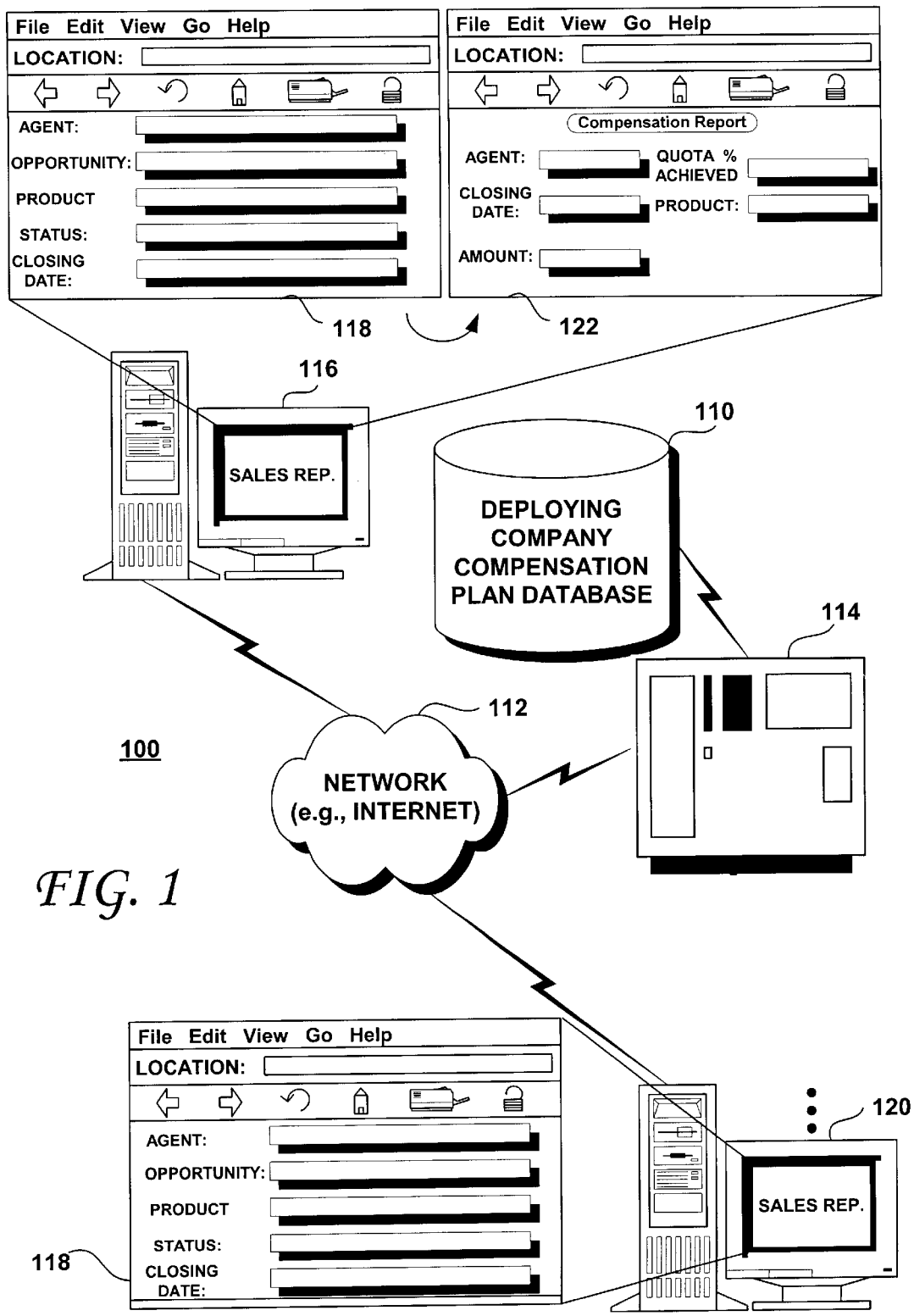
FIG. 1 is a diagram of the system for computing and reporting the compensation for sales agents within a corporate sales force, according to an embodiment of the present invention.

FIG. 1 illustrates a system 100 for computing and reporting sales-based compensation (commissions) for sales agents within a sales force, according to an embodiment of the present invention. The system 100 includes at least one first computer, as shown at 114, and at least one second computer, such as shown at 118, 120. The first computer 114 may be a server to which the second computers 116, 120 may securely log into from a remote location via the network 112. The network 112 may include the Internet, as well as any other private, public or hybrid networks, for example. The server 114 may store or may otherwise communicate with a database 110. The database 110 may store the compensation plan or plans that the deploying company (the company deploying and implementing the methods and systems of the present invention) uses to determine the compensation of their sales agents. In broad terms, a compensation plan includes the conditions that a sales agent must meet to be paid compensation, and how much compensation is to be paid. Compensation plans may include a plurality of plan elements, including several revenue classes, quotas, transaction factors, incentives and/or compensation rates, for example. There may be a single compensation plan for all sales agents or there may any number of individual compensation plans, each tailored to a single sales agent, to a group of sales agents, to a single product or product family, or to a group of products or product families or any combination thereof. In short, the compensation plan(s) may be as numerous and as broadly applicable or narrowly tailored as necessary to implement the corporate sales strategy. Moreover, the compensation plan(s) may be effective only for a limited time period, and/or may include special promotions and/or incentives. Each of the second computers 116, 120 may be configured to access the database 110 through the network 112 and the server(s) 114. According to an embodiment of the present invention, the second computers 116, 120 may run an HTML- and/or dHTML-based browser, such as Netscape Navigator, for example, to remotely access the database 110. Indeed, the computer instructions to carry out the present invention may advantageously form part of a Web-based application written in HTML and/or dHTML, for example. The specification of Hyper Text Markup Language (HTML) and Dynamic Hyper Text markup Language (dHTML) are set forth, for example, in Musciano & Kennedy, *HTML, The Definitive Reference, $3^{rd}$ Edition,* © 1998, O'Reilly & Associates and Goodman, *Dynamic HTML: The Definitive Reference,* © 1998, O'Reilly & Associates, the entire text of each being incorporated herein by reference.

Upon logging in and after being successfully authenticated, a sales agent, according to an embodiment of the present invention, may be sent to a secure World Wide Web (hereafter "Web") page 118, in which he or she is prompted to input sales data into the database 110. The sales data may include data relating to past sales and may include data relating to future sales opportunities. According to the present invention, sales may be characterized as a continuum, according to the status thereof. Upon initial contact, the potential sale may be thought of a mere lead. A lead may be developed upon a first call to or contact with a new potential customer, which is known as a cold call, in the case wherein the first contact was unsolicited. An opportunity is more qualified than a lead, and connotes a greater confidence that the sale will ultimately be consummated. In broad terms, an opportunity may be defined as a potential revenue event associated with a current or potential customer.

An opportunity may have an opportunity value associated therewith, which quantifies the sale in terms of revenue to the deploying company should the sale be closed. An opportunity value, for example, may include the standard value of the items or services to be sold to the customer, without any rebates, discounts, etc. An opportunity may have a status assigned thereto, depending upon the degree of confidence ascribed to the opportunity by the sales agent and/or according to the state of the sale. A different value may be associated with the opportunity each time the status thereof is upgraded or downgraded. For example, an opportunity status of "upside" may indicate the best-case opportunity value, should the underlying sale be closed without granting the customer any rebates or incentives. The upside amount of an opportunity may be equal to the opportunity value or may be a lower amount. An opportunity may have a status of "forecasted" if the sales agent is confident that the sale will, in fact, take place. A forecasted opportunity may also be propagated to those in hierarchical superior positions in the sales force, to inform them and corporate management to expect a quantified future revenue from the pending sale. A forecasted opportunity may have a forecasted amount associated therewith, which may thought of as a realistic estimate of the amount of revenue to be generated from the underlying sale. An opportunity having a status of "closed" may indicate that the sale has taken place, although the deploying company may not yet have realized any revenue therefrom. Other opportunity statuses may be devised and implemented within the context of the present invention. Moreover, each opportunity may be assigned a "win probability", which may be expressed as a percentage that quantifies the sales agent's evaluation of the probability of closing the sale.

After entering the requested sales data into the appropriate fields, as shown at 118 in FIG. 1, the inputted sales data and any appropriate previously inputted sales are applied to an appropriate one or ones of the compensation plans stored in the database 110. The sales agent's compensation is then calculated based upon the past sales data, inputted sales data and the appropriate compensation plan(s). The compensation plan(s) to which the inputted sales data is applied may be the sales agent's individual compensation plan(s), or it may be the appropriate compensation plan(s) for the type of goods and/or services sold by the sales agent to the customer, or any combination thereof. The calculated compensation may then be reported to the sales agent, as shown in the Web page referenced at 122 in FIG. 1. The compensation report 122 is preferably reported to the sales agent in real time; that is, immediately and using the most up-to-date compensation plans and sales information available to the database 110. According to the present invention, the sales report 122 may include an aggregation (e.g., a sum) of the sales agent's past sales and the sales agent's anticipated future sales, as quantified by the opportunities previously entered into the database 110, as well as the sales agent's compensation based upon these aggregate sales and opportunities. In this manner, the sales agent may gain an immediate and on-demand insight into his or her likely future compensation, should all of the inputted opportunities close; that is, result in sales. Therefore, instead of expending a considerable amount of time attempting to manually compute their compensation by means of a scratchpad or spreadsheet, the sales agents of the deploying company may simply input the relevant sales data into the database 110 and generate a compensation report on demand, which report provides the sales agent with their likely future compensation, to whatever degree of detail and in whatever form the deploying company deems appropriate.

The compensation report may include a single number representing the sales agent's potential compensation under the relevant compensation plan(s), or the report may break the sales agent's compensation into one or more categories, each representing one or more products and/or services that the sales agent is tasked with selling. In this manner, the sales agent having requested the compensation report may readily identify where to most profitably direct their sales efforts, for example. As the compensation plan(s) is preferably drafted to implement the corporate sales strategy, the interests of the sales agent and that of the deploying company are aligned.

The compensation report 122 may quantify the percentage of the sales agent's quota achievement, as shown in FIG. 1. This quota may also be broken into product categories, whether such product categories refer to goods and/or services to be sold by the sales agent. As the sales agent has previously specified the period to be encompassed by the compensation report, the report may also list the report's ending date. For example, the generated report may include monthly payments, but also may include quarterly, semi-annual or annual performance-based commissions and/or bonuses, for example. The compensation report 122 may also be configured to report the sales agent's compensation for these items as well by manually specifying the closing date of the report 122.

Preferably, the calculated compensation amount or amounts are hyperlinked, to allow the sales agent to "drill down" to the constituent past (closed) sales and/or constituent future sales opportunities thereof. That is, upon "clicking" with a mouse or other pointing device on the reported compensation amount(s), the sales agent may bring up a representation on his or her browser of the constituent sales opportunities and/or past sales that contributed to the calculated compensation amount shown in the compensation report.

Figure 2:
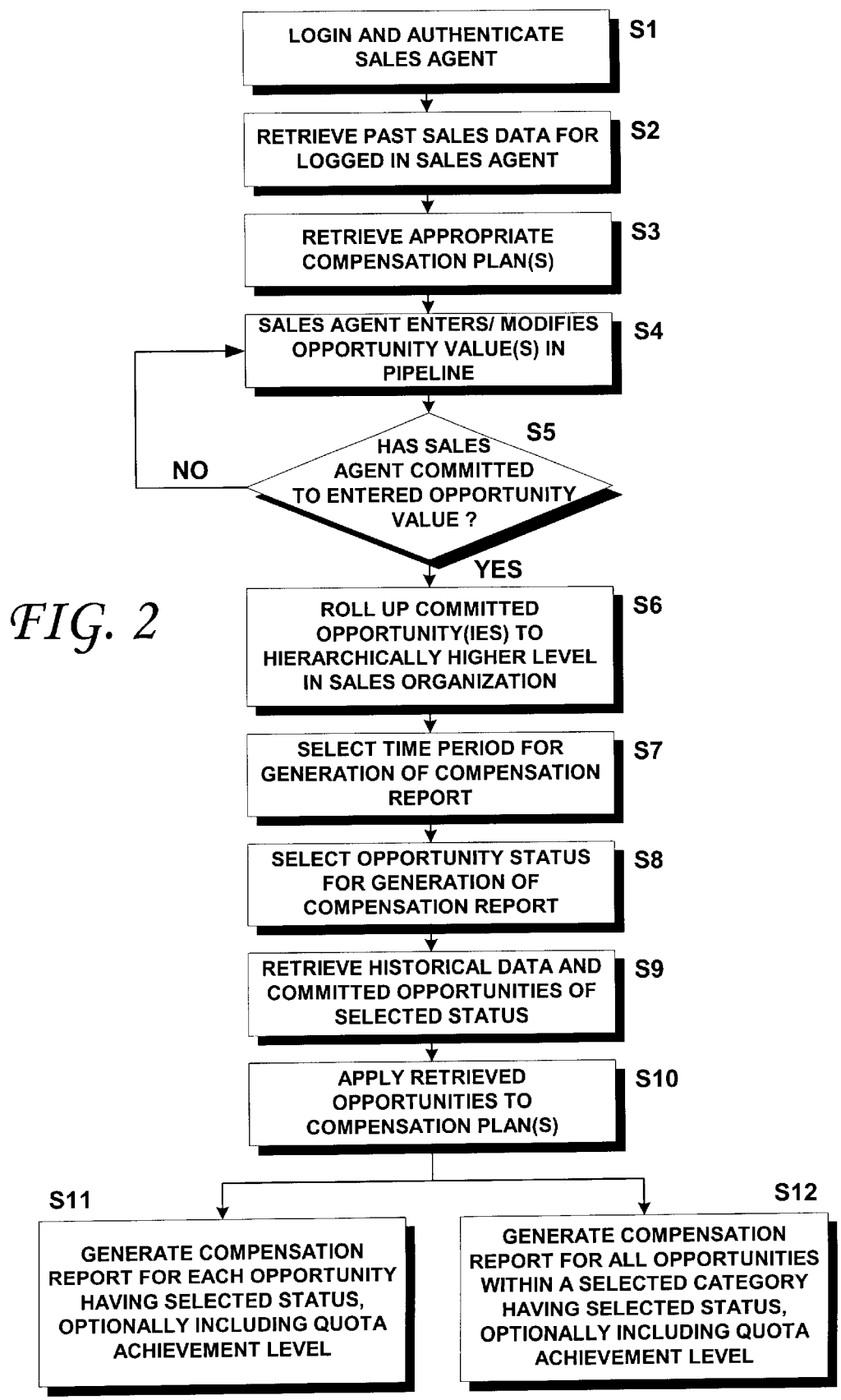
FIG. 2 is a flowchart of the computer-implemented method of computing and reporting the compensation for sales agents within a corporate sales force, according to an embodiment of the present invention.

FIG. 2 is a flowchart of a computer-implemented method for computing and reporting the compensation for sales agents within a corporate sales force, according to an embodiment of the present invention. As shown therein, step S1 calls for the sales agent to be logged in and authenticated. In step S2, the past (closed) sales data and any previously inputted future sales opportunities for the logged in sales agent may be retrieved from the database 110. The appropriate compensation plan(s) for the logged in sales agent may then also be retrieved from the database 110, as shown at S3. Alternatively, step S3 may be executed before step S2 is executed. As shown in step S4, the sales agent may then input any opportunities values in his or her sales pipeline and/or may modify any previously entered opportunity values, depending upon an assigned permission level. The sales agent may also change the status of any of his or her previously inputted opportunities, again depending upon an assigned permission level. For example, the sales agent may upgrade the status of an opportunity from "upside" to "forecasted", if the underlying sale is about to close or if the sales agent has great confidence that the sale will, in fact, be consummated. The sales agent may continue to input opportunities and/or modify previously entered opportunities at will. When the sales agent decides that the opportunities inputted accurately reflect his or her past sales and future sales opportunities, the sales agent may "commit" to these past sales and future opportunities, as shown at S5. Committing to an opportunity, according to the present invention, means that the inputted past sales and future opportunity values will be "rolled-up" (e.g., visible and accessible) to the sales agent's hierarchical superior in the sales organization, as shown at S6.

Step S7 call for the sales agent to select a time period for the generation of the compensation report. The time period, for example, may be any arbitrary period, or may be Quarter-To-Date (QTD) or Year-To-Date (YTD) period, for example. The opportunity status for the compensation report may then be selected, as shown at S8. For example, the compensation report may only report on those opportunities having a status of "upside" or higher, such as "forecasted", for example. The historical sales data and the committed opportunities having the selected status may then be retrieved form the database 110, as shown at S9. The retrieved opportunities may then be applied to the compensation plan(s) retrieved in step S3, in the same manner that numerical values are applied to variables of a mathematical formula. The sales agent, or the sales agent's hierarchical superiors in the sales organization may then generate one or more compensation reports, examples of which are outlined in steps S11 and S12. The sales agent may select the type of report to be generated, depending upon the nature of the information sought. For example, as shown at S1, the compensation report (shown at 122 in FIG. 1) may detail each opportunity having the selected status and may also include an indication of the achievement percentage level of the quota assigned to the sales agent, if any. As shown at S12, the compensation report may encompass all opportunities of the selected status, and may also include an indication of the achievement percentage of the quota assigned to the sales agent. Other compensation reports may be generated including, for example, a by-product or service report, reports encompassing all products and/or services, only past sales, only future sales opportunities, etc. In this manner, the sales agent may easily and accurately determine their compensation (commission) and plan their future income, all without expending significant effort or time doing so.

FIG. 3 shows another example of a compensation report according to an embodiment of the present invention. As suggested therein, the compensation report may be generated on a browser, such as Netscape Communicator, for example. After inputting the requested information in a previous screen (as shown at 118 in FIG. 1, for example), the sales agent, the compensation plan, the reporting period and the currency in which to represent the values may be displayed as header information, as shown at 310. In the example of FIG. 3, the sales agent is Jane E. Smith, the compensation plan retrieved from the database 110 of FIG. 1 is called "FY2000 Sales Rep. Lvl. 1), the reporting period of the report ends June 2000 and the currency in which the report is presented is US dollars. The type of report to be generated may also be selected, as shown in the report selection section 320. For example, the selection section 320 may include icons enabling the sales agent to generate a Compensation Summary Report (highlighted in the example of FIG. 3), a Compensation Detail Report, a Blind ranking of other sales agents of similar standing in the sales organization and an income planner tool, allowing the sales agent to extrapolate his or her yearly commission income, for example. Other reports may be generated by selectively processing and displaying of the sales information inputted by the sales agent and/or retrieved from the database 110.

The sales agent's aggregate sales and opportunity values may be graphically or textually represented or may be represented in tabular form. In the example of FIG. 3, the sales agent's performance is represented as a percentage of the sales quota assigned to the sales agent. In FIG. 3, this percentage is represented as a bar graph 330. The bar graph 330 may show the quota achievement percentage for all products and/or services the sales agent is charged with selling or may show only a specific product and/or service. In the representative example of FIG. 3, the bar graph 330 shows the sales agent's up to date achievement level of her quota for computer sales (hashed bars) and operating systems (OS) sales (white bars). As shown in FIG. 3, the bottom portion 340 of the browser screen may include the value of the corporation's revenue for the sales attributed to the agent, the commission earned on those sales, and/or the sales agent's quota achievement percentage, both for PTD and YTD, for example. It is to be understood that FIG. 3 is but an example of the organization of the generated compensation report and that the compensation reports according to the present invention may be organized in a completely different manner and/or have a completely different appearance and content. For example, the generated compensation report may include user-definable fields to adapt the report to the requirements of a particular company or industry. Moreover, the appearance of the report may be customized to more closely match the deploying corporation's identity by modifying colors, textures, fonts and the like. Generally, any information stored and/or inputted in the database 110 may be included in the generated report or represented in the data entry screens.

Any sales information included in the compensation report shown in FIG. 3 may be hyperlinked to allow the sales agent to view the underlying individual sales events (opportunities and closed sales) that contributed to the displayed amount. For example, portions of the quota achievement bar graph 330 may be hyperlinked to the constituent sales events that contributed to the displayed quota level. Likewise, the "commission earned" amount may itself be hyperlinked to allow the sales agent (and/or any other authorized person) to view the constituent sales events that contributed to the sales agent's commission. This information may then be displayed in any manner, such as by means of tables, textual information or graphically, for example.

The present invention allows commissioned (and other) sales agent real time access to compensation information, without the need to enter such information in a spreadsheet or estimate compensation using paper and pencil. Moreover, the present invention allows the sales agent to create "what if" scenarios by inputting hypothetical sales information to determine the effect of those hypothetical sales on their compensation.

Hardware Description

Figure 4:
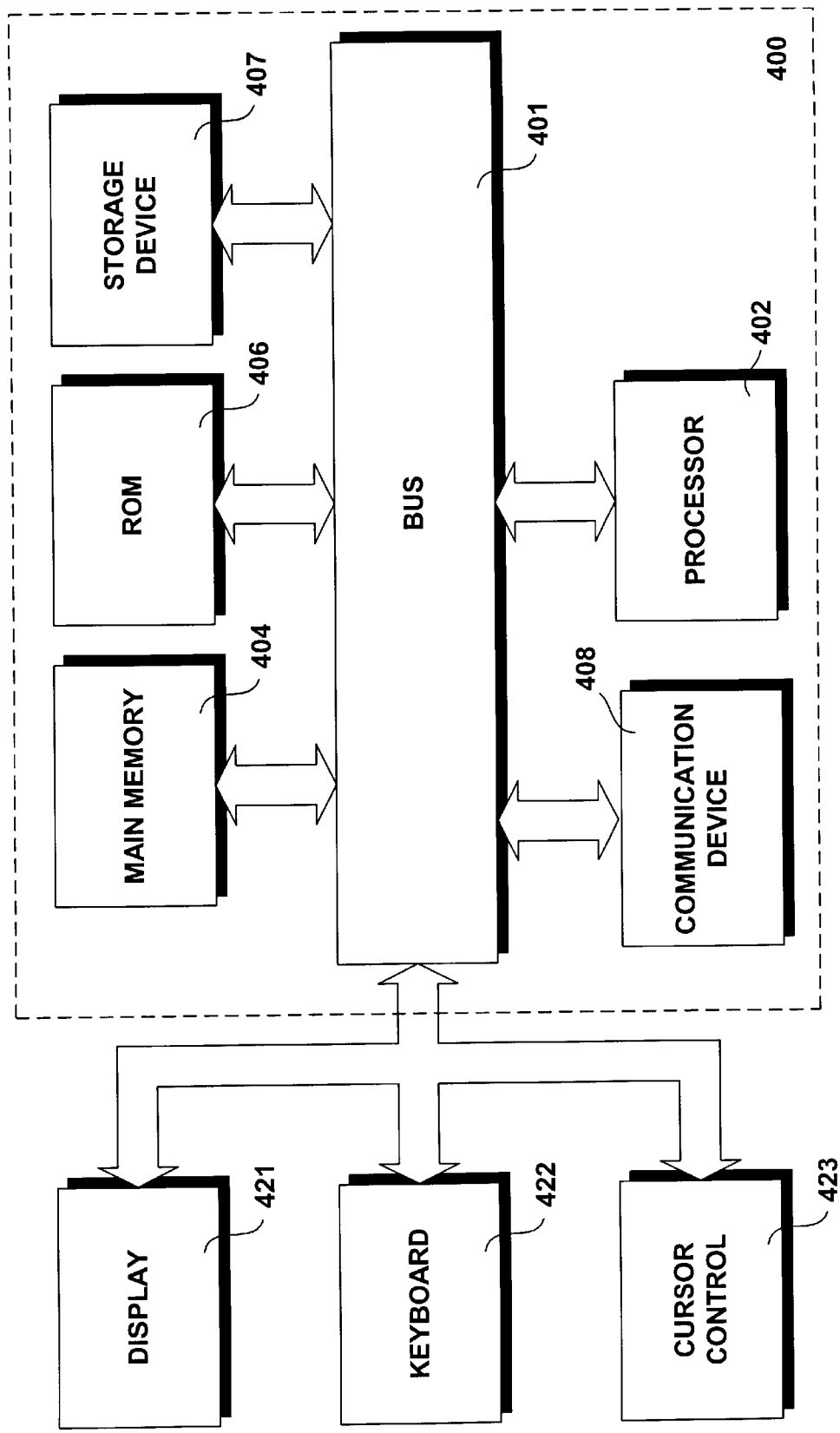
FIG. 4 is a block diagram of a computer suitable for implementing the present invention.

FIG. 4 illustrates a block diagram of a computer system 400 with which an embodiment of the present invention may be implemented. Computer system 400 includes a bus 401 or other communication mechanism for communicating information, and a processor 402 coupled with bus 401 for processing information. Computer system 400 further comprises a random access memory (RAM) or other dynamic storage device 404 (referred to as main memory), coupled to bus 401 for storing information and instructions to be executed by processor 402. Main memory 404 also may be used for storing temporary variables or other intermediate information during execution of instructions by processor 402. Computer system 400 also includes a read only memory (ROM) and/or other static storage device 406 coupled to bus 401 for storing static information and instructions for processor 402. A data storage device 407, such as a magnetic disk or optical disk, is coupled to bus 401 for storing information and instructions. A communication device 408, such as a modem or network (such as Ethernet, for example) card is also coupled to the bus 501 to provide access to a network, such as shown at 112 in FIG. 1.

The computer system 400 may also be coupled via bus 401 to a display device 421, such as a cathode ray tube (CRT), for displaying information to a computer user. An alphanumeric input device 422, including alphanumeric and other keys, is typically coupled to bus 401 for communicating information and command selections to processor 402. Another type of user input device is cursor control 423, such as a mouse, a trackball, or cursor direction keys for communicating direction information and command selections to processor 402 and for controlling cursor movement on display 421.

The present invention is related to the use of computer system 400 to implement methods and systems for computing and reporting the compensation for sales agents within a corporate sales force, according to the present invention. According to one embodiment thereof, the system for computing and reporting the compensation for sales agents is provided by one or more computer systems 400 in response to processor(s) 402 executing sequences of instructions contained in memory 404. Such instructions may be read into memory 404 from another computer-readable medium, such as data storage device 407. Execution of the sequences of instructions contained in memory 404 causes processor(s) 402 to implement the methods disclosed herein. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A computer-implemented method of computing a compensation for a sales agent within a corporate sales force, comprising the steps of:
    creating a sales agent compensation plan, the compensation plan being tailored to provide an incentive for the sales agent to sell goods and/or services according to a corporate sales strategy;
    storing the compensation plan within a database;
    providing remote access to the database via a computer network;
    enabling the sales agent to remotely access the database and to input past sales into the database and to input, qualify, modify and store future sales opportunities into the database;
    applying the past sales and future sales opportunities to the stored compensation plan to calculate a compensation for the sales agent;
    reporting the calculated compensation to the sales agent over the network.

2. The method of claim 1, wherein the computer network includes the Internet.

3. The method of claim 1, wherein the enabling step includes a step of allowing the sales agent to securely log onto an application adapted to carry out the functionality of at least the applying and providing steps.

4. The method of claim 1, wherein the enabling step provides access to the database using an HTML and/or dHTML-enabled browser.

5. The method of claim 1, wherein the calculated compensation is determined for a specified time period.

6. The method of claim 1, wherein the creating step includes a step of including at least one sales quota for the sales agent in the compensation plan, and wherein the reported compensation includes an indication of an achievement level of the at least one sales quota by the sales agent.

7. The method of claim 1, further including a quota for each of the goods and/or services for which the sales agent is tasked with selling.

8. The method of claim 1, wherein the calculated compensation reported to the sales agent is broken down into a plurality of compensation categories.

9. The method of claim 8, wherein the reported compensation in each of the compensation categories is hyperlinked to a corresponding inputted sales opportunity.

10. The method of claim 1, further including the step of inputting hypothetical sales opportunities, wherein the reported calculated compensation reflects the sales agent's past sales and the inputted hypothetical sales opportunities to enable the sales agent to forecast a compensation to be received if the inputted hypothetical sales opportunities close.

11. The method of claim 1, wherein the sales agent qualifies the sales opportunity by assigning a status to the sales opportunity.

12. The method of claim 11, further comprising a step of specifying the status of the sales opportunities to be applied to the stored compensation plan to calculate and report the compensation for the sales agent.

13. The method of claim 6, wherein the achievement level of the at least one sales quota is represented as at least one of a graph, text and table.

14. The method of claim 1, further comprising the step of modifying the created compensation plan to conform to an updated corporate sales strategy.

15. The method of claim 1, further including the step of substituting the created compensation plan with a new compensation plan, the applying step then applying the past sales and future sales opportunities to the new compensation plan to calculate the compensation for the sales agent.

16. The method of claim 1, wherein the creating step creates a plurality of compensation plans and wherein the applying step applies the past sales and future sales opportunities to at least one of the plurality of compensation plans.

17. A computer-implemented method for providing an indication of a compensation for a sales agent within a corporate sales force, comprising the steps of:
    retrieving past sales and future sales opportunities of an authenticated sales agent from a database;
    retrieving at least one compensation plan for the authenticated sales agent;
    applying the retrieved past sales and future sales opportunities to the retrieved at least one compensation plan to calculate a compensation of the sales agent;
    providing an indication of the calculated compensation to the authenticated sales agent remotely over a computer network.

18. The method of claim 17, wherein the computer network includes the Internet.

19. The method of claim 17, wherein the providing step provides the calculated compensation to the sales agent using an HTML and/or dHTML-enabled browser.

20. The method of claim 17, wherein the calculated compensation is determined for a specified time period.

21. The method of claim 17, wherein the at least one compensation plan includes at least one sales quota, and wherein the provided indication of the compensation includes an indication of an achievement level of the at least one sales quota by the sales agent.

22. The method of claim 21, further including a quota for each of the goods and/or services for which the sales agent is tasked with selling.

23. The method of claim 17, wherein the calculated compensation provided to the sales agent is broken down into a plurality of compensation categories.

24. The method of claim 23, wherein the provided compensation in each of the compensation categories is hyperlinked to a corresponding inputted sales opportunity.

25. The method of claim 17, further including the step of inputting hypothetical sales opportunities, wherein the provided indication of the calculated compensation reflects the retrieved sales agent's past sales, future sales opportunities and the inputted hypothetical sales opportunities to enable the sales agent to forecast his or her compensation to be paid if the inputted hypothetical sales opportunities close.

26. The method of claim 17, wherein each of the future sales opportunities have a status assigned thereto and wherein the providing step provides the indication of the calculated compensation according to the assigned status.

27. The method of claim 21, wherein the providing step provides the achievement level of the at least one sales quota as at least one of a graph, text and table.

28. An electronic system for remotely providing sales agents within a sales force with an indication of their sales-based compensation over a computer network, the system comprising:

a database configured to store at least one compensation plan, past sales of the sales agents and future sales opportunities of the sales agents;

at least one first computer arranged to receive login and authentication requests from the sales agents over the computer network, to retrieve an appropriate compensation plan for each of the logged in and authenticated sales agents from the database and to retrieve each of the sales agents' past sales and future sales opportunities from the database and to apply the retrieved past sales and future sales opportunities to the appropriate compensation plan upon request to generate a compensation report for each of the sales agents and to send the generated compensation reports to the at least one second computer;

at least one second computer, the at least one second computer being arranged to accept login and authentication requests from the sales agents and to send the requests to the at least one first computer over the computer network, to input new future sales opportunities into the database, to modify future sale opportunities previously stored in the database, to request the compensation report from the at least one first computer and to display the compensation report received from the at least one first computer.

29. The system of claim 28, wherein the at least one first computer is further arranged to include an indication of achieved quota level in the generated compensation report.

30. The system of claim 29, wherein the at least one second computer is arranged to display the indication of achieved quota level as at least one of a graph, a table and text.

31. The system of claim 28, wherein the computer network includes the Internet.

32. The system of claim 28, wherein the at least one second computer is arranged to display the generated compensation report within an HTML and/or dHTML-enabled browser.

* * * * *